(12) United States Patent
Nemmani et al.

(10) Patent No.: US 11,516,295 B1
(45) Date of Patent: Nov. 29, 2022

(54) USING CONTEXTUAL INFORMATION FOR VEHICLE TRIP LOSS RISK ASSESSMENT SCORING

(71) Applicant: State Farm Mutual Automobile Insurance Company, Bloomington, IL (US)

(72) Inventors: Krishna Nemmani, McKinney, TX (US); Zebediah Robert Black, Wylie, TX (US); Corey Casmedes, Plano, TX (US); Hoang Dang, Garland, TX (US); Yuncheng Gao, Garland, TX (US); Tyler Hargreaves, Flower Mound, TX (US); John Steven Kirtzic, Plano, TX (US); Zongzhe Li, Richardson, TX (US); Einar Longva, Manhattan, NY (US); Victor Mao, Export, PA (US); Trac Nguyen, Norcross, GA (US); Sivarama Kirshna Panguluri, McKinney, TX (US); Dalton Sherer, Richardson, TX (US); Edward Yang, Frisco, TX (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 17/111,933

(22) Filed: Dec. 4, 2020

Related U.S. Application Data

(60) Provisional application No. 62/944,821, filed on Dec. 6, 2019.

(51) Int. Cl.
*H04L 67/12* (2022.01)

(52) U.S. Cl.
CPC .................................. *H04L 67/12* (2013.01)

(58) Field of Classification Search
CPC ... H04L 67/12; B60W 30/0956; B60W 40/04; B60W 40/09; B60W 2040/0818; B60W 40/06; B60W 50/14; B60W 2050/0089; B60W 2420/52; B60W 2552/00; B60W 2554/00; B60W 50/0205; B60W 2554/4046; B60W 30/0953; B60W 40/10; B60W 60/0015; B60W 60/00274; B60W 2540/30; B60W 50/08; B60W 60/0011; H04W 4/38; G08G 1/123; G08G 1/096725; G08G 1/096741; G08G 1/01; G08G 1/07;
(Continued)

(56) References Cited

U.S. PATENT DOCUMENTS 9,081,650 B1 * 7/2015 Brinkmann .......... G07C 5/0808
9,311,271 B2 4/2016 Wright
(Continued)

*Primary Examiner* — Backhean Tiv
*Assistant Examiner* — Linh T. Nguyen
(74) *Attorney, Agent, or Firm* — Lee & Hayes, P.C.

(57) ABSTRACT

A technique is provided for determining a loss risk assessment score for a vehicle trip. The technique includes, at a vehicle, a computing device receiving first information indicative of operation of the vehicle. The technique also includes, at the vehicle, the computing device receiving second information indicative of an environment at a particular location and time. The computing device correlates the first information and the second information to generate a data set. The technique also includes determining a score for the vehicle trip based at least in part upon the generated data set.

21 Claims, 5 Drawing Sheets

(58) Field of Classification Search
CPC ........... G08G 1/0968; G08G 1/096805; G08G 1/164; G08G 1/0962; B60K 2370/193; B60K 2370/178; B60K 2370/48; B60K 2370/797; B60K 2370/15; B60K 2370/52; G06Q 40/08; G06Q 10/0635; G06Q 30/0207; G06Q 20/0855; G06Q 10/0639; G06Q 30/0283; G06Q 20/308; G06Q 30/0269; G06Q 30/0224
See application file for complete search history.

(56) References Cited

U.S. PATENT DOCUMENTS

| | | | |
|---|---|---|---|
| 9,633,487 B2 | 4/2017 | Wright | |
| 9,846,977 B1 * | 12/2017 | Cox | G07C 5/085 |
| 10,192,369 B2 | 1/2019 | Wright | |
| 10,198,879 B2 | 2/2019 | Wright | |
| 10,392,022 B1 * | 8/2019 | Rau | B60W 40/12 |
| 10,726,493 B1 * | 7/2020 | Kyne | G06Q 40/08 |
| 10,902,521 B1 * | 1/2021 | Kanevsky | G06Q 40/08 |
| 10,960,895 B1 * | 3/2021 | Gaudin | B60W 50/045 |
| 11,217,045 B2 * | 1/2022 | Uno | G07C 5/008 |
| 2010/0090839 A1 * | 4/2010 | Omi | B60K 28/04 340/576 |
| 2011/0246051 A1 * | 10/2011 | Vang | G08G 1/0962 701/117 |
| 2013/0046562 A1 * | 2/2013 | Taylor | G06Q 40/00 705/4 |
| 2015/0046132 A1 * | 2/2015 | Papajewski | B60W 40/107 703/2 |
| 2016/0267335 A1 * | 9/2016 | Hampiholi | B60K 28/06 |
| 2016/0379310 A1 * | 12/2016 | Madigan | G07C 5/0825 705/4 |
| 2017/0291611 A1 * | 10/2017 | Innes | G07C 5/0841 |
| 2017/0310630 A1 * | 10/2017 | Soltan | G06F 3/04817 |
| 2018/0075309 A1 * | 3/2018 | Sathyanarayana | B60K 35/00 |
| 2018/0127001 A1 * | 5/2018 | Ricci | G01C 21/26 |
| 2018/0276485 A1 * | 9/2018 | Heck | G01C 21/3461 |
| 2018/0340784 A1 * | 11/2018 | Upadhyay | F01N 9/002 |
| 2019/0283745 A1 * | 9/2019 | Nagel | G08G 1/166 |
| 2019/0313223 A1 * | 10/2019 | Taylor | A61B 5/02055 |
| 2019/0389483 A1 * | 12/2019 | Likhterman | B60W 50/085 |
| 2021/0078609 A1 * | 3/2021 | Barth | B60W 60/0057 |
| 2021/0081863 A1 * | 3/2021 | Gonzalez | G07C 5/0816 |
| 2021/0089048 A1 * | 3/2021 | Tran | G06K 9/00798 |
| 2021/0108926 A1 * | 4/2021 | Tran | G06K 9/00791 |

* cited by examiner

USING CONTEXTUAL INFORMATION FOR VEHICLE TRIP LOSS RISK ASSESSMENT SCORING

RELATED APPLICATIONS

This application claims priority to U.S. Provisional Application 62/944,821, filed Dec. 6, 2019, titled "USING CONTEXTUAL INFORMATION FOR VEHICLE TRIP LOSS RISK ASSESSMENT SCORING," the entirety of which is contained herein by reference.

BACKGROUND

Organizations such as insurance companies have an interest in obtaining information from which they can determine insurance premiums that reward good driving habits. For example, for an automobile insurance company, demographic information of a driver (such as residence location, age, years of driving experience and moving violation history) has been used as input to loss risk assessment models. More individualized information about the driver and how she drives can help to reward good driving habits. For a driver whose activity indicates that she drives in a manner that is less likely to result in loss for the automobile insurance company, this may result in a lower automobile insurance premium for the driver than for other drivers with similar demographic attributes.

SUMMARY

Driver activity information alone, even when combined with demographic information, may not be sufficient for loss risk assessment and may not properly reward good driving behavior. That is, without considering the context of the environment in which the driver activity information was generated, the driver activity information may be an inaccurate indicator of loss risk. In some cases, the actual loss risk corresponding to particular driver activity may be lower and, in other cases, the actual loss risk corresponding to a particular driver activity may be higher when considering the context of the environment in which the driver activity information was generated.

This disclosure describes, in part, techniques to develop an indication of loss risk assessment for a driving trip of a vehicle. The techniques may include, during the vehicle driving trip, observing driver activity. Identifying driver activity may include collecting data from sensors that are attached to the vehicle or are otherwise moving with the vehicle during the driving trip. The techniques may also include, during the trip, obtaining information indicative of a context of the identified driver activity, at the time and location of the identified driver activity. Such context may include, for example, environmental conditions at the time and location of the identified driver activity.

Obtaining information indictive of environmental conditions may include, for example, obtaining information indicative of weather, traffic, and/or road work occurring at the time and location of the identified driver activity. As another example, such environmental conditions may include laws and/or regulations in place governing driving at the time and location of the observed driver activity, which may include, for example, information about a speed limit at the time and location of the observed driver activity.

Obtaining information indicative of a context of the identified driver activity may include observing conditions at the vehicle and/or may include interrogating one or more collections of data (e.g., datastores) indicative of conditions for multiple locations throughout a geographic territory. The collections of data may be provided, for example, by one or more services that collect and provides contextual information for locations throughout a territory. Interrogating a collection of data may include, for example, accessing the information (e.g., information indicative of the context of the identified driver activity) using one or more application programming interfaces (APIs).

The techniques may further include, during the driving trip, generating, using a computing device, event records that include an indication of identified driver activity correlated with an indication of obtained contextual information for the identified driver activity. Generating event records during a driving trip may include, for example, receiving, with a computing device, information indicative of driver activity at times/locations during the vehicle trip, and obtaining, with the computing device, information indicative of a context of the identified driver activity, at the times/locations of the observed driver activity. The computing device may collect the event records into a data set.

The techniques may also include, at or after the driving trip concludes, processing, with the computing device at the vehicle, or another computing device, the event records data set to determine a score for the driving trip. In some examples, a computing device generates the driving score and updates it during the driving trip, which may also include the computing device generating and updating the driving score at or after the driving trip concludes.

In some examples, the techniques described herein may be implemented in the context of a portable electronic device such as a mobile phone. However, the techniques described herein are not limited to use with a portable electronic device. For example, the techniques described herein may be implemented in a computing device that is in or attached to an automobile or other vehicle, such as a computing device that is attached to or otherwise in communication with an on-board diagnostic (OBD) port of a vehicle. As another example, the techniques described herein may be implemented in a computing device that is part of a vehicle's electronics, such as electronics used to control the vehicle's engine, an on-vehicle infotainment system, and/or other systems. In some examples, the techniques implemented herein may be distributed among a plurality of computing devices.

Some of the techniques may be performed by a back-end server or other remotely-accessible computing device, such as in the "cloud," in communication with a computing device that is in or attached to an automobile or other vehicle continuously, intermittently, synchronously, asynchronously, real time, near real-time, and/or otherwise. The techniques are not limited by this disclosure to being performed by a computing device at any particular location.

A loss risk assessment determined in consideration of the context of observed driver activity for a particular vehicle trip may more accurately represent a probability of loss by an automobile insurance company and, thus, may better reward good driving behavior.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
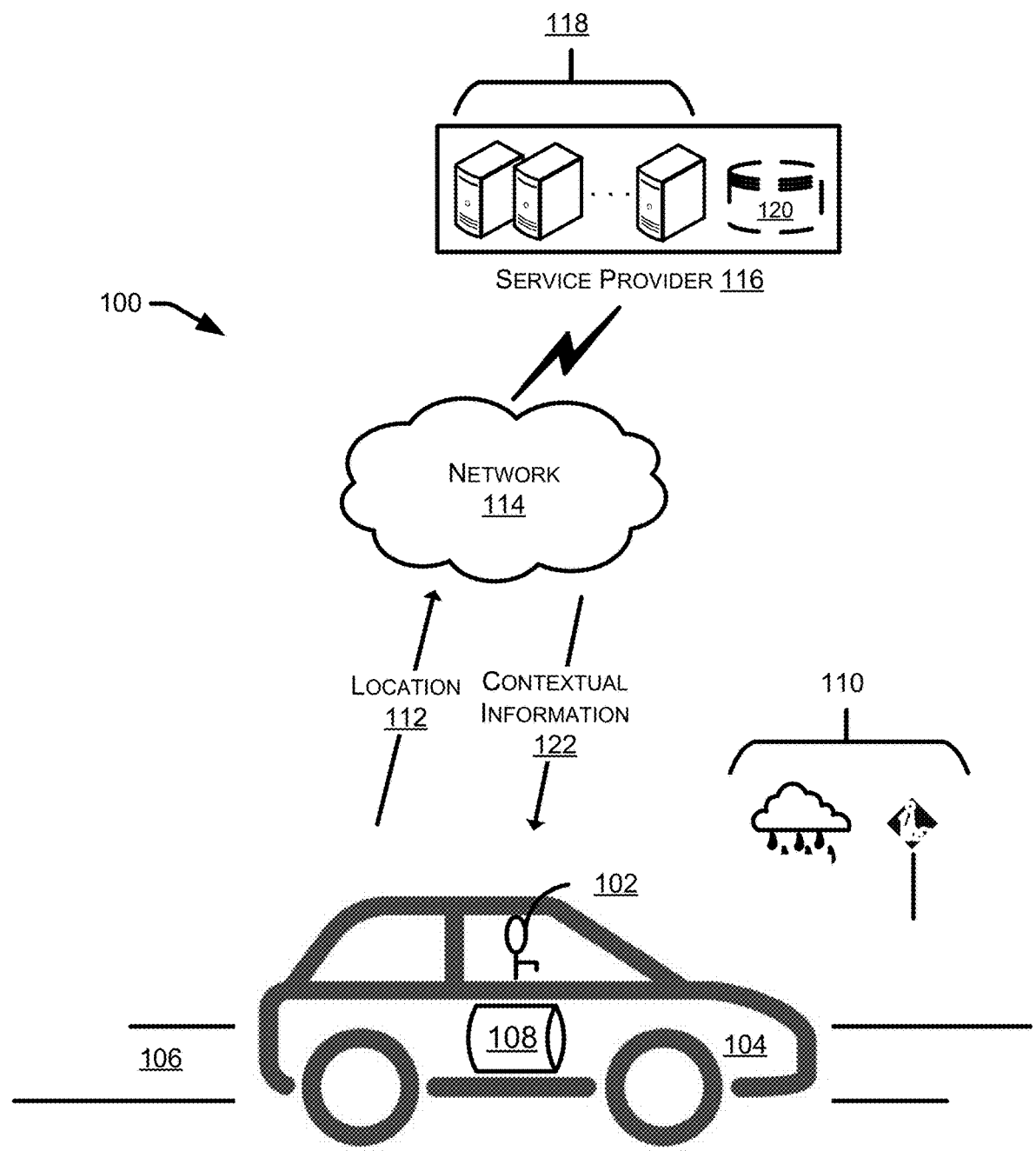
FIG. 1 schematically illustrates an environment in which the described techniques may operate, according to examples of the disclosure.

FIG. 1 is a diagram schematically illustrating an environment 100 in which the described techniques may operate. In such an environment, a driver 102 may be operating a vehicle 104 during a driving trip on one or more roads 106. A driving trip may, but is not required to, have a determinable beginning and end. During the driving trip, a computing device, as described in greater detail in conjunction with FIG. 3, attached to or in the vehicle compiles a collection of event records 108. Each event record may, for example, include both an indication of driver activity correlated with an indication of obtained contextual information for the driver activity. Thus, according to some examples of the disclosure, the computing device collects indication(s) of driver activity, indication(s) of contextual information, correlates individual indication(s) of driver activity with corresponding respective indication(s) of the contextual information, and stores an indication of individual pairs of driver activity with its corresponding contextual information as individual event records.

For example, the computing device may obtain data indicating driver activity at one or more particular times and locations. The computing device may also obtain information indicative of a context of the observed driver activity, at the times and locations of the driver activity. The computing device may correlate, such as by using timestamp and/or location information, the obtained data indicating driver activity at each particular time and location with the obtained data indicative of a context of the driver activity, at the respective time and location of the driver activity. The computing device may create, for the particular time and location, an event record that includes both the data indicating driver activity at the particular time and location and the obtained data indicative of a context of the driver activity, at the time and/or location of the driver activity. The computing device may create a plurality of event records in this manner. The data indicative of a context of the driver activity may include, for example, information indicative of conditions 110 such as weather, road work, road conditions, level of traffic, and/or any suitable condition at the time and/or location of the driver activity.

In some examples, the computing device obtains data indicative of a context of the driver activity using sensors attached to or otherwise moving with the vehicle 104 on the road 106. For example, the computing device may obtain information about weather using one or more moisture sensors, such as the type of moisture sensors (e.g., optical sensors) utilized on automobiles to determine whether to automatically activate the windshield wipers. The computing device may obtain other information about weather using a temperature sensor (e.g., thermocouple, thermistor, thermometer, etc.) utilized on automobiles for obtaining and displaying outside temperature (e.g., ambient temperature) to a driver. As another example, the computing device may obtain information about road work using a microphone to sense sound or other audio inputs associated with construction noise, and/or a visual sensor to detect the presence of signs or other visual indications of road work.

In some examples, the computing device may obtain data indicative of a context of the observed driver activity at the particular time and location by providing an indication 112 of the location via a network 114 to a service provider 116. The indication 112 may also include an indication of time, or the time may be implied by the time that the computing device provides the indication 112. The service provider 116 may include one or more servers 118 and one or more storage devices 120. For example, the service provider 116 may store, on the one or more storage devices 120, one or more collections of data indicative of conditions for multiple locations throughout a geographic territory. The service provider 116 may provide the contextual information 122 back to the computing device at the vehicle 104, via the network 114. The service provider(s) 116 may be any suitable source, such as a navigation and/or mapping service (e.g., GOOGLE MAPS, APPLE MAPS, etc.), a weather reporting service (e.g., THE WEATHER CHANNEL, WEATHER.COM, etc.), etc.

Figure 2:
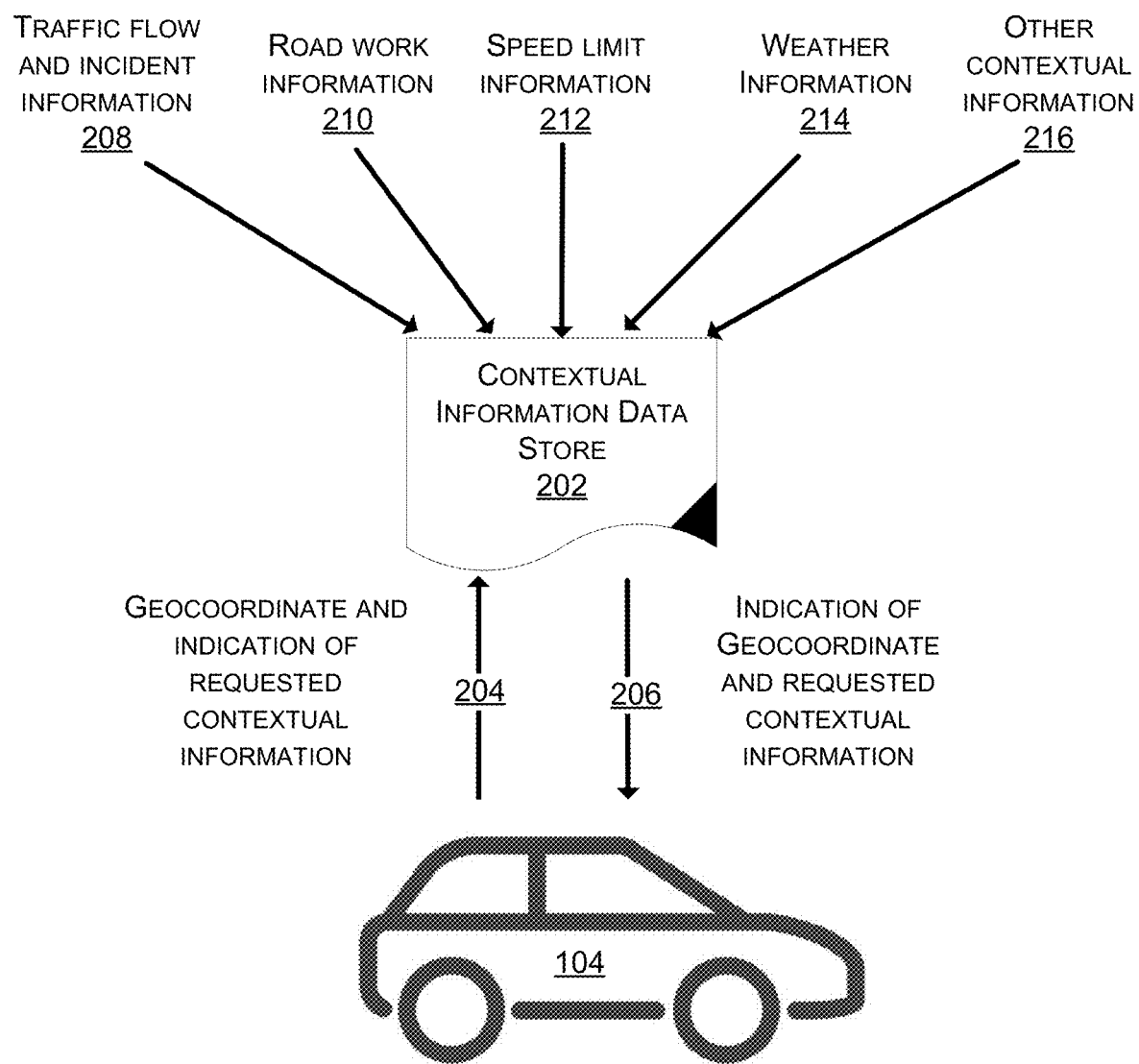
FIG. 2 conceptually illustrates examples of the type of contextual information that may be in a contextual information data store, such as the one or more storage devices at the service provider, according to examples of the disclosure.

FIG. 2 conceptually illustrates examples of the type of contextual information that may be in a contextual information data store 202, such as in the one or more storage devices 120 at the service provider 116. A request 204 from a computing device in the vehicle 104 for contextual information may include a geocoordinate indicating the location for the requested contextual information, as well as an indication of what contextual information is being requested. The service provider 116 may provide a response 206 that may include, for example, the geocoordinate (or some other indication of location, whether express or implied) and may also include the requested contextual information. In some examples, the request 204 does not include an indication of what contextual information is being requested. Rather, the request 204 may be a general request, and the computing device in the vehicle 104 parses the response 206 for particular contextual information of interest.

The service provider 116 may index contextual information in the data store 202, for example, by the location and time to which it corresponds. In addition or alternatively, the service provider 116 may constantly update contextual information in the data store 202 such that it can be assumed valid at the time which the data store 202 is interrogated for particular contextual information. In one example, location is indicated by a combination of latitude and longitude indication, although other types of location indications may be used.

One example of the contextual information is traffic flow and incident information 208. For example, the contextual information may include real-time traffic flow data, provided as an object formatted in, for example, extensible markup language (XML), JavaScript Object Notation (JSON), or the like. The real-time traffic flow information may include, for example, information on speed and congestion for one or more location(s) specified in a request 204. Additional traffic flow contextual data may include data such as the geometry of road segments in relation to the traffic flow. The data store 202 may also include aggregated information about traffic incidents, provided in XML or JSON format, for example, including the type and location of each traffic incident, current status, start and/or end time, and/or other relevant data. The indications of traffic incidents may also include, for example, an indication of severity of an incident (e.g., low impact to critical, with gradations of severity in between), as well as an indication of a span of locations affected by the incident. By the data in the data store 202 indicating a span of locations affected by the incident, the device may optimize the number of requests 204 for contextual information, i.e., avoiding additional requests for incident information while the vehicle is still within the span of locations indicated as being affected by an incident.

Another example of contextual information in the data store 202 may include, for example, indications of road work 210. In some examples, the data store 202 may include the indications of road work 210 as a subset of the traffic flow and incident information 208. Indications of road work 210 may include, for example, an indication of the type of road work and, similar to the discussion of traffic incident information, an indication of severity of the road work (e.g., low impact to critical, with gradations of severity in between) as well as an indication of a span of locations affected by the road work. In some cases, indications of road work 210 may include information such as number of lanes closed, estimates of expected delays, projections and/or estimates of traffic congestion, combinations thereof, or the like.

Speed limit information 212 may also be included as contextual information in the data store 202. The speed limit information 212 may also include an indication of a span of locations. In some examples, an indication may be provided that there is no actual speed limit. In some examples, speed limit information 212 be provided in conjunction with road work information 210, such as when the speed limit is lowered in areas of road work and/or in road work zones that include areas of road work. In some cases, school zones, church zones, and/or other areas of reduced and/or irregular speed limits may be indicated in the speed limit information 212.

Another example of contextual information in the data store 202 may include weather information 214. The weather information 214 may include an indication of precipitation at a particular location and may also provide additional information about the precipitation, such as type of precipitation (rain, sleet or snow, for example) and rate of precipitation. In addition, the weather information 214 may include an indication of wind speed, wind direction, and/or other information about current wind conditions. The weather information 214 may also include temperature. The weather information 214 may further include an indication and/or estimate of accumulated precipitation (e.g., flash flood areas, expected snow accumulation, probability of icy roads, etc.).

The contextual information in the data store 202 may also include other contextual information 216, and it is not limited to being one or more of traffic flow and incident information 208, road work information 210, speed limit information 212 or weather information 214.

Figure 3:
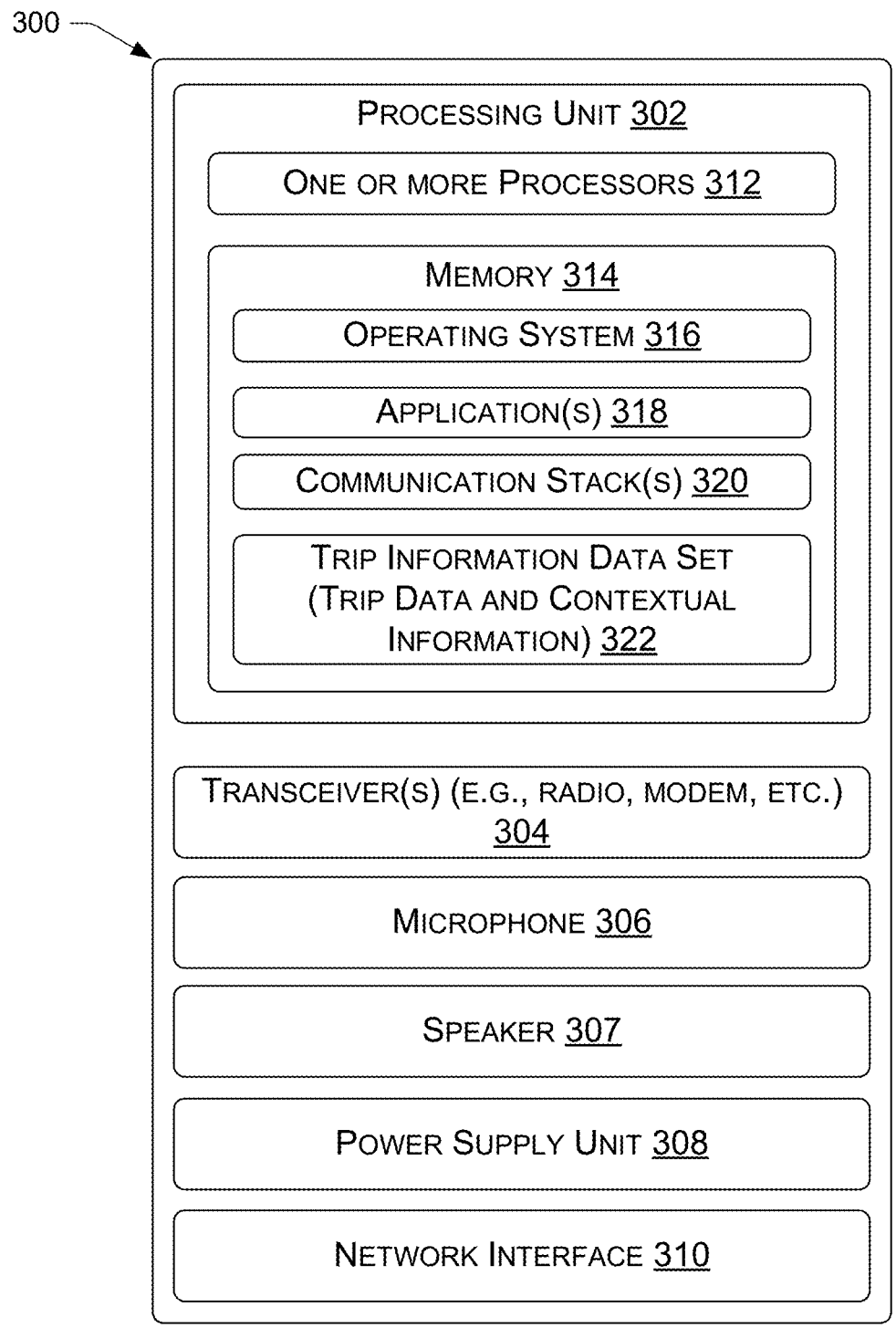
FIG. 3 schematically illustrates components of an example computing device attached to or in a vehicle that compiles a collection of event records for use in determining an indication of loss risk assessment for a driving trip of the vehicle, according to examples of the disclosure.

FIG. 3 schematically illustrates components of an example computing device 300 that may comprise a computing device 300 attached to or in a vehicle 104 that compiles a collection of event records 108, for use in determining an indication of loss risk assessment for a driving trip of the vehicle 104. The example computing device 300 may comprise any type of device, such as a mobile phone or other mobile computing device (e.g., a tablet computing device), a personal computer such as a desktop computer or laptop computer, a portable navigation device, gaming device, portable media player, in-vehicle infotainment system, a vehicle computer, television, set-top box, automated teller machine, and so forth. In some examples, the computing device 300 is a computing device that also performs functionality for the vehicle other than functionality used in determining an indication of loss risk assessment for a driving trip of a vehicle. For example, the computing device 300 may be part of a vehicle's navigation system, a vehicle's engine control system, a vehicle's entertainment system or other system of the vehicle. In some examples, the computing device 300 is a specialized device configured specifically for determining an indication of loss risk assessment and, in other examples, the computing device 300 may perform other functionality as well.

As shown in FIG. 3, an example computing device 300 may include at least one of a processing unit 302, a transceiver 304 (e.g., radio, modem, etc.), a microphone 306, a speaker 307, power supply unit 308, and a network interface 310. The processing unit 302 may include one or more processors 312 and memory 314. The one or more processors 312 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver 304 may comprise one or more hardware and/or software implemented radios to provide two-way RF communication with other network communication devices in a network. The transceiver 304 may additionally or alternatively include a modem or other interface device to provide wired communication from the computing device 300 to other devices.

The microphone 306 may comprise physical hardware though, in some cases, an audio input interface may instead be provided to interface to an external microphone or other sound receiving device. Similarly, the speaker 307 may comprise physical hardware though, in some cases, an audio output interface may instead be provided to interface to an external speaker or other sound emitting device. The power supply unit 308 may provide power to the computing device 300. In some instances, the power supply unit 308 comprises a power connector that couples to an Alternating Current (AC) or Direct Current (DC) mains power line. In other instances, such as when the computing device 300 is a mobile phone or other portable device, the power supply unit 308 may comprise a battery.

The memory 314, or non-transitory computer-readable media, may include an operating system (OS) 316 and one or more applications 318 that are executable by the one or more processors 312. The OS 316 may provide functionality to present a display portion of a visual/tactile user interface on a display of the computing device 300. The memory 314 may also include one or more communication stacks 320 configured to receive, interpret, and/or otherwise communicate with other devices. For example, the communication stacks may implement one or more of a cellular communication protocol, a WiFi communication protocol, or other wireless or wired communication protocols. The communication stack(s) 320 describe the functionality and rules governing how the computing device 300 interacts with each of the specified types of networks.

The memory 314 may also store other information. For example, the memory 314 may store a trip information data set 322 with contents that may be processed to determine a loss risk assessment for a vehicle trip. The trip information data set 322 may include an indication of driver activity during one or more trips, as well as indications of obtained contextual information for the driver activity. Thus, the trip information data set 322 may include the driver activity associated with its corresponding contextual information.

The various memories described herein (e.g., the memory 314) are examples of computer-readable media. Computer-readable media may take the form of volatile memory, such as random-access memory (RAM) and/or non-volatile memory, such as read-only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media includes non-transitory media.

While detailed examples of certain computing devices (e.g., the example computing device 300) are described herein, it should be understood that those computing devices 300 may include other components and/or be arranged differently. As noted above, in some instances, a computing device 300 may include one or more processors 312 and memory 314 storing processor executable instructions to implement the functionalities, as described herein, to generate trip information data set(s) 322. Certain computing devices 300 may additionally or alternatively include one or more hardware components (e.g., application specific integrated circuits, field programmable gate arrays, systems on a chip, and the like) to implement some or all of the functionalities they are described as performing.

Figure 4:
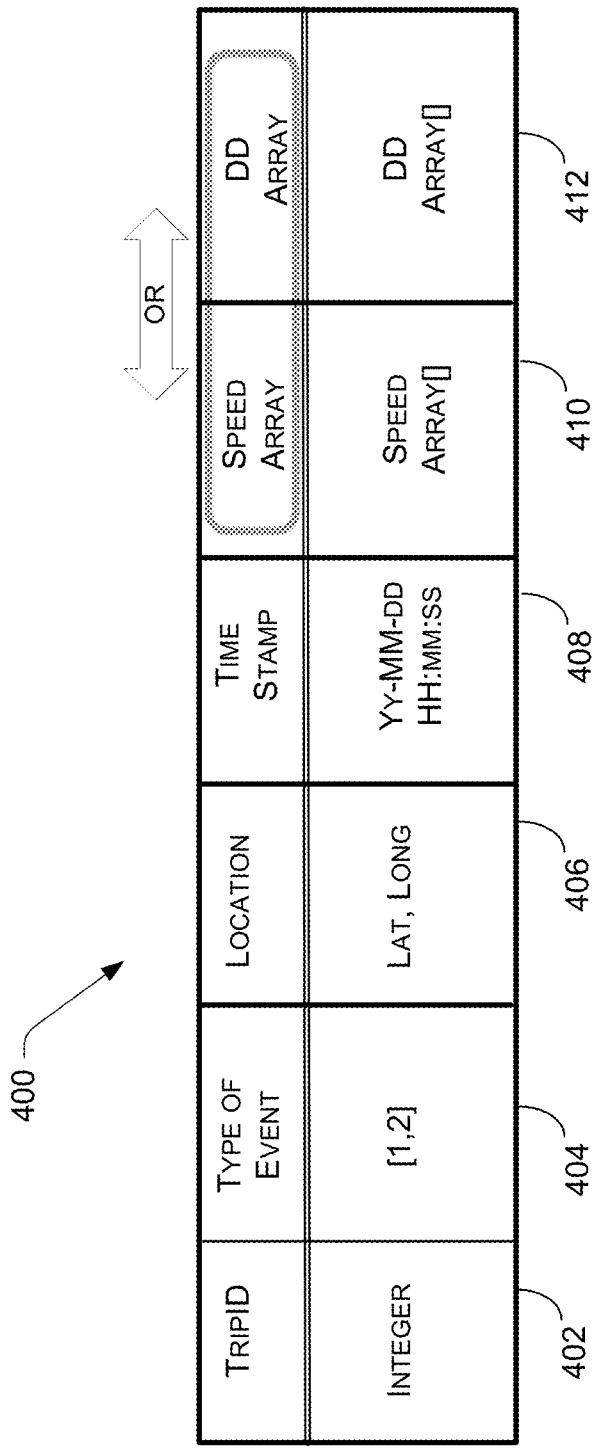
FIG. 4 illustrates an example of an event data object that a computing device in a vehicle may use to record an unsafe driving event, according to examples of the disclosure.

FIG. 4 illustrates an example of an event data object 400 that a computing device in a vehicle may use to record an unsafe driving event, including data associated with the unsafe driving event, such as in a memory 314 or other storage device associated with or otherwise accessible to the computing device 300. The event data object 400 may include an indication of contextual information associated with the event, such as associated with a location of the event on the vehicle trip. The computing device 300 in the vehicle 104 may record multiple such unsafe driving events during a vehicle trip. The computing device 300 in the vehicle 104, or another device, may process the event data objects 400 during and/or after a vehicle trip to, for example, determine a loss risk assessment score for the vehicle trip.

Still referring to the FIG. 4 example event data object 400, the content of the TripID field 402 may be an integer that identifies a vehicle trip with which the event data object is associated. This can be useful, for example, if event data objects for multiple vehicle trips are stored together, for the computing device 300 to determine with which vehicle trip the event data object 400 is associated. Alternatively, the TripID field 402 may include any suitable identifier of the event data object 400, such as any suitable alphanumeric string indicating a particular event data object 400. The content of the "Type of Event" field 404 is a two-part key, with a first index and a second index. The first index indicates whether the event data object 400 is recording an acceleration/deceleration event, a speeding event or a distracted driving event. These are example event types, and other event types are possible. In an example, an acceleration/deceleration event is indicated in the first index by an integer "1"; a speeding event is indicated by an integer "2"; and a distracted driving event is indicated by an integer "3." It should be understood that these codes/integers are merely examples, and in other embodiments, additional and/or different codes/integers/symbols may be used.

In one example of observing and recording vehicle activity, the computing device 300 in the vehicle 104 generates an event data object 400 when vehicle activity indicates unsafe driver behavior. For example, with respect to a speeding event, the computing device may generate an event data object 400 indicating a speeding event if the observed vehicle speed at a location on the vehicle trip is more than a threshold level, such as five miles per hour, under or over the speed limit for the location, as indicated by contextual information received at the vehicle 104.

The second index of the Type of Event field 404 indicates a subcategory of the type of event. For example, a speeding in weather event and any other speeding event may share the same first index number, since they are both speeding events, but may have different second index numbers in order to differentiate between the two subcategories. As another example, the second index may indicate speeding in a school zone or a construction zone. Yet other examples of the second event may be the level of traffic and/or congestions on the road when an acceleration/deceleration event occurred. Thus, in some implementations, the first index of the Type of Event field 404 may indicate a driver activity (e.g., hard acceleration, hard braking, fast cornering, speeding, distracted driving, etc.) and the first index of the Type of Event field 404 may indicate context information associated with the driver activity. In this way, the indication of the driver activity may be associated with and arranged in a predetermined format with its corresponding indication of context information.

Still referring to FIG. 4, the content of the "Location" field 406 includes data indicative of the location at which the event occurred. In one example, the computing device 300 stores the location as a latitude/longitude data pair, but the computing device may use other location data formats in other examples. The computing device may determine the location using positional equipment (such as a global positioning system, or GPS, receiver) that is incorporated into or communicatively coupled to the computing device 300. Alternatively, the computing device 300 may receive location information from another device, such as a vehicle navigation or other system of the vehicle 104.

The "Time Stamp" field 408 holds data indicative of a time at which the event occurred. In one example, the computing device 300 stores the time as a combination of digits that indicates year, month, day, hour, minute and second at which the event occurred. The computing device 300 may use other time data formats in other examples. The computing device 300 may determine the time using an internal clock that is incorporated into and/or maintained by the computing device 300. Alternatively, the computing device 300 may receive time information from another device such as the vehicles navigation system or, in another example, as part of a GPS signal received by the computing device 300.

The "Speed Array" field 410 and the "DD" (distracted driving) field 412 are alternate fields, where the first index in the Type of Event field 404 indicates which one of the Speed Array field 410 and the DD field 412 is included in the event data object 400. In general, in one example, the Speed Array field 410 and/or the DD Array field 412 represents a timeline of what happened during the course of a vehicle trip. In the case where the first index in the Type of Event field 404 indicates a speeding event, the Speed Array field 410 is included, and the computing device 300 stores in the Speed Array field 410 an array of matching timestamps, speeds, and locations, which collectively indicate how long and on what route the speeding activity occurred. In the case where the first index in the Type of Event field 404 indicates a distracted driving event, the computing device 300 stores in the DD Array field 412 an array of matching timestamps and distracted driving indications, such as texting by a driver, and these collectively indicate how long and what activity constituted the distracted driving event. In some alternative cases, both the Speed Array field 410 and the DD field 412 may be included in the event data object 400. In other examples, other types of array fields may be included to store an array of matching timestamps and driver activity events of types other than speeding and distracted driving.

Also, in some examples, an event may not be ongoing, such that the event may not include an array field such as the Speed Array field 410 or the DD Array field 412. For example, an acceleration/deceleration/cornering event may occur within a narrow period of time such that including an array field for such an event would add little additional information. For example, a cornering event may be recorded when the g-force of that cornering event exceeds a threshold level (e.g., 1.5 g-units, or 14.7 m/s$^2$), as measured by an accelerometer in and/or associated with the computing device 300. In these cases, the fields 410, 412 may not be included, or may indicate a different parameter than what is shown in the example event data object 400. As another example, the type of event may be a hard braking event. This hard braking event may be encoded in the type of event field 404 of the event data object 400, but may not include any additional continuing data that would be indicated in fields 410, 412.

The event data object 400 may be transmitted, in examples, from the computing device 300 (e.g., the driver's smartphone in the vehicle 104) to one or more server(s) that may process the event data object 400 to provide a risk assessment associated with the driver 102 and/or the trip during which the event data object 400 was generated. In alternate cases, the computing device 330 may determine a trip score, individually or in conjunction with the one or more server(s). It should be appreciated that regardless of where and/or how the trip score is generated, the event data object 400 organizes the relevant inputs to generate the trip score. In particular, the event data object 400 includes both an indication of the driver activity and an indication of the corresponding contextual information. The computing device 300 may generate one or more of event data objects 400 for a particular trip.

As discussed herein, the event data objects 400 for a trip may be sent by the computing device 300 to one or more server(s), such as a server in the cloud associated with an analytics organization and/or an insurance company, and those event data objects 400 may then be used to determine a trip score for the corresponding trip and driver 102. The trip scores for a driver 102 may be used to guide the risk profile of the driver 102 and/or guide the process of setting rates and/or stipulations for insuring the driver 102. The mechanism of determining risks associated with a driver 102, as described herein, may be more comprehensive and accurate than traditional mechanisms, as not only is the driver activity considered, but also any mitigating and/or aggravating situations, as embodied in the corresponding contextual information may be considered.

It should further be appreciated that the one or more servers that may determine a trip score or otherwise assess the risk profile of a particular trip and/or driver 102 may be enabled to use the contextual information, in addition to the driver activity information. By grouping the driver activity with its corresponding contextual information, the computing device 300 enables efficient operations of the one or more servers in determining the trip score. Without the computing device 300 associating and sending the contextual information with the driver activity, as indicated in the event data objects 400, the one or more servers would need to associate individual incoming contextual information with its corresponding driver activity and further with individual drivers 102. Thus, it is understood that the systems and methods, as disclosed herein, improve the efficiency of computing, particularly in the realm of client-server interactions for risk assessment. The disclosure, therefore, improves the operations of computing functions, and in turn, reduces the amount of processing bandwidth and network bandwidth to perform the functions described herein. Additionally, the methods and systems described herein improve the field of risk assessment and/or the determination of insurance products and/or pricing. In other words, not only does the disclosure improve the operation of computers and/or networks, but the disclosure also improves specific features of risk assessment, driving safety assessment, and/or insurance pricing assessment, and/or insurance products offered to customers.

Figure 5:
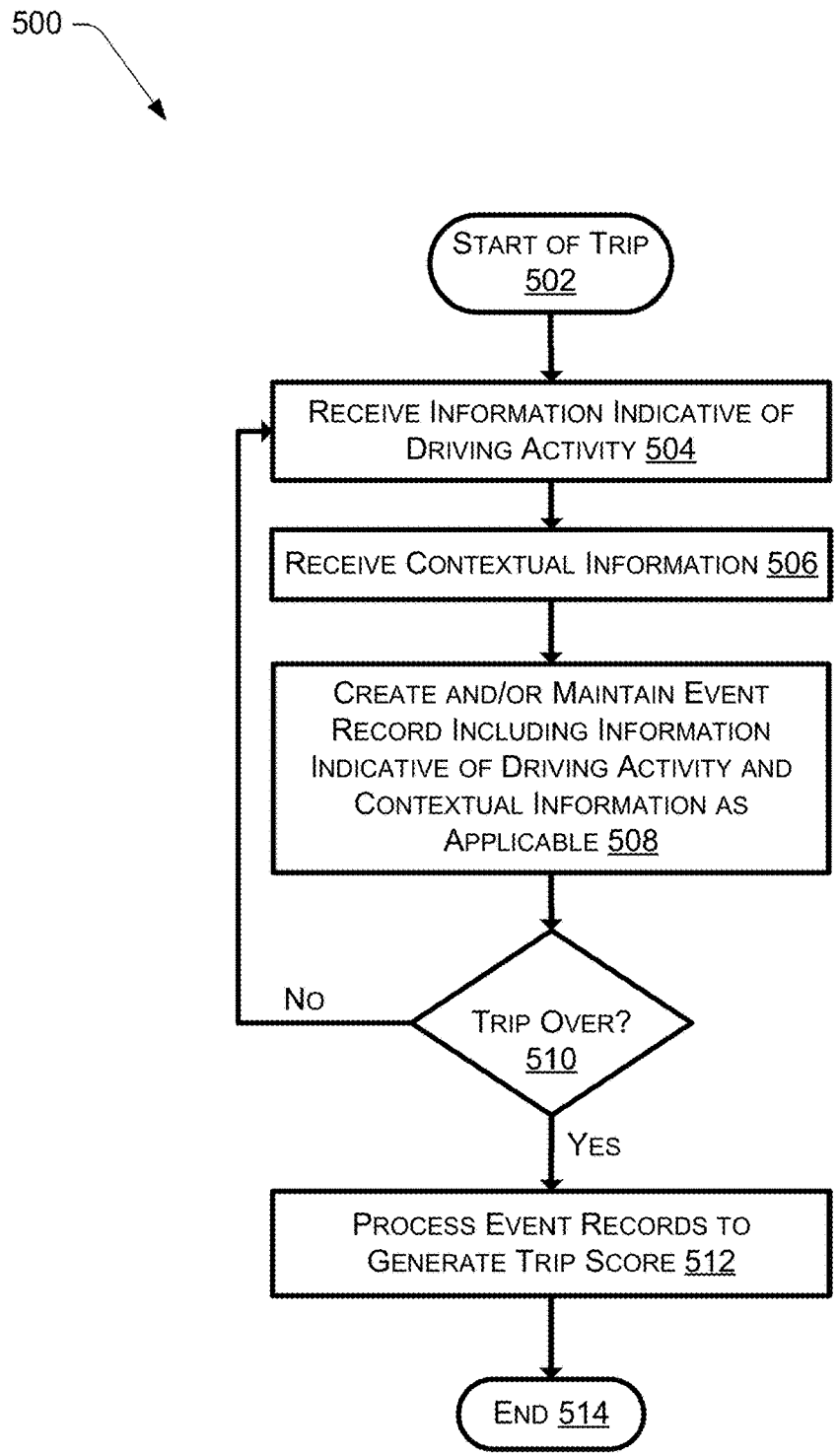
FIG. 5 is a flowchart illustrating an example process for a computing device in a vehicle to record driver activity data during a vehicle trip, including contextual information of the driver activity, according to examples of the disclosure.

FIG. 5 is a flowchart illustrating an example process 500 for a computing device 300 in a vehicle 104 to record driver activity data during a vehicle trip, including contextual information of the driver activity, and to process the recorded driver activity data and contextual information after a vehicle trip to, for example, determine a score for the vehicle trip. As mentioned above, in some examples, driver activity data and contextual information may be processed during and/or after a vehicle trip to determine a score for the vehicle trip.

Referring to FIG. 5, at 502, the process 500 starts. In one example, a driver 102 interacts with (e.g., provides an input such as a touch input or verbal input, etc., to) the computing device 300 that is executing the process 500 in order to signify that a vehicle trip is beginning. In other examples, the computing device 300 includes sensors or interacts with sensors that create output indicative of a vehicle trip beginning. Other methods for signifying a vehicle trip is beginning are also possible. For example, a driver 102 may log-in to his or her application on his or her computing device 300 (e.g., smartphone), when he or she is ready to drive in his or her vehicle 102. In some examples, the computing device may establish a communicative link with one or more other computing devices of the vehicle 104. For example, the computing device 300 in the form of a smartphone may establish, such as via handshaking protocols, a communicative connection with a computer of the vehicle to receive various aspects of driver activity (e.g., speed, acceleration, deceleration, etc.) and/or context information (e.g., precipitation conditions, traffic conditions, temperature, etc.). The communicative link may be of any suitable type, such as BLUETOOTH, WIFI DIRECT, the OBD port, combinations thereof, or the like.

At 504, the computing device may receive information indicative of driving activity. For example, the information the computing device 300 receives may include speed information that is available from a computer of the vehicle, such as via the OBD port of the vehicle 104 or a BLUETOOTH connection. In some configurations, the computing device 300 may determine speed of the vehicle 104 by measuring the time it takes to travel a particular distance, using a GPS or other location-indicative signal to determine locations, and therefore distance. As another example, the driving activity information may include an indication of acceleration, deceleration and/or cornering of the vehicle. Such information may be provided from an accelerometer of the vehicle 104 and available, for example, via the OBD port of the vehicle. In some configurations, the computing device 300 itself may include an accelerometer, GPS receiver, a compass, and/or a gyroscope. For example, many smart phones include an accelerometer (e.g., a micro-electromechanical system (MEMS)-based accelerometer).

At 506, the computing device 300 may receive contextual information corresponding to the information indictive of driving activity. This may include, for example, information about the environment at a location for the time the vehicle 104 was at that location. For example, the computing device 300 may receive information indicative of driving activity at a particular location and may request contextual information for the particular location. For example, the computing device 300 may receive information indicative of the vehicle speed at a particular location and may request speed limit information for the particular location. For example, the computing device 300 may be programmed to periodically or occasionally request speed limit and/or other contextual information. As another example, a service provider 116 (e.g., GOOGLE MAPS) may provide the speed limit information without the computing device 300 requesting it, such as periodically or occasionally or, in some examples, when there is a speed limit change based on the location of the vehicle 104 as the computing device 300 reports the location to the service provider 116. As other examples, the computing device 300 may request or be provided road work information and/or weather information for the particular location.

In some examples, the computing device 300 does not request particular contextual information, but only provides a general request for contextual information periodically or occasionally, and available contextual information is provided. In other examples, the particular information is provided to the computing device 300, such as on a schedule and/or upon change of information (such as a change in speed limit or a change in road work conditions), without the computing device 300 specifically requesting the contextual information. Thus, in some cases the computing device 300 may receive the contextual information responsive to a request by the computing device 300 for the contextual information. In other cases, the computing device may receive the contextual information periodically in an unsolicited manner and/or streaming manner. In yet other cases, the computing device 300 may receive contextual information responsive to an event (e.g., a change in speed limits). In the cases where the contextual information is received on a periodic basis, the time between successively received contextual information may be any suitable period, such as every second, every 5 second, every 15 seconds, every minute, or indeed any fixed or variable time period.

In whatever manner the computing device 300 receives the contextual information, the computing device 300 typically is able to determine a location for the contextual information. For example, the computing device 300 may match the received contextual information to the location in a request the computing device 300 made for the contextual information. Additionally or alternatively, the contextual information may include an indication of location to which the contextual information corresponds and/or a time at which the computing device 300 requested the contextual information.

At 508, the computing device 300 creates and/or maintains information indicative of driving activity and contextual information, as applicable. For example, the computing device 300 may determine that a speeding event has begun. That is, for example, the computing device 300 may determine that the speed of the vehicle 104 at a particular location, as indicated by driver activity information the computing device 300 receives, is outside an allowable bound of the speed limit, as indicated by the speed limit contextual information the computing device 300 receives. The computing device 300 may create or otherwise initiate an event record for the speeding event, such as an event record having a format of the FIG. 4 event record object 400, or any other suitable data set indicating the speeding event. As another example, the computing device 300 may determine that the driver is distracted, as indicated by driver activity information the computing device 300 receives. The computing device 300 may create or otherwise initiate an event record for the distracted driving event, such as an event having a format of the FIG. 4 event record object 400.

Using the FIG. 4 event record object 400 format as an example, the computing device, at 508 of the FIG. 5 process 500, may initiate the event record object 400 by storing an integer corresponding to a TripID for the vehicle trip in the TripID field 402. The computing device may also store, in the Type of Event field 404, a first index corresponding to a speeding event (or other suitable event). Depending on the contextual information the computing device 300 has received for the location at which the speeding data was measured, the computing device may store, in the Type of Event field 404, a second index corresponding to a subcategory of the type of event. For example, the computing device 300 may store a second index that indicates a speeding in weather event, if the computing device 300 receives contextual information corresponding to the time and location at which the speed data was measured indicating, for example, poor weather at the time and location such that the driver 102 should operate the vehicle 104 at a speed lower than the posted or regulatory speed limit.

If, at 508, an event record has already been created or otherwise initiated, the computing device 300 may add the driver activity information and corresponding contextual information to the event record. Still using the FIG. 4 event record 400 as an example, the computing device 300 may add the driver activity information and corresponding contextual information to the Speed Array field 410 or DD Array field 412.

At 510, the computing device 300 determines if the vehicle trip is over. For example, the computing device 300 may determine the vehicle trip is over based on an indication by the driver interacting with (such as by providing inputs to) the computing device 300 that is executing the process 500 in order to signify that a vehicle trip is beginning. As another example, the computing device 300 may be operating a navigation program or be in communication with a navigation program. The navigation program may indicate to the computing device that the vehicle 104 has reached the destination as indicated to or determined by the navigation program. If the computing device 300 determines the vehicle trip is not over, the computing device 300 continues to receive information indicative of driving activity at 504, receives contextual information at 506, and so on. If computing device 300 determines the vehicle trip is over, at 512, the computing device may, in some examples, process the event records to determine a trip score for vehicle trip.

For example, at 512, the method 500 may include causing the computing device 300 to execute an instruction to analyze the event records 400 that are stored in the trip information data set 322. In some embodiments, analyzing the event records 400 may include determining risk-increasing or risk-reducing behavior is represented by the data in the event record objects 400, including assigning a score to the risk-reducing or increasing behavior. For example, the computing device 300 may consider one or more thresholds of risk-reducing or risk-increasing behavior. For example, if an event record 400 that is stored in the trip information data set 322 indicates the driver 102 has travelled at twenty miles per hour over the posted speed limit or advisable speed for conditions, then the computing device 300, in its analysis, may assign a score indicating a higher degree of risk-increasing behavior than if the event record 400 stored in the trip information data set 322 indicates the driver has travelled at five miles per hour over the posted speed limit or advisable speed. The computing device 300 performing the analysis at 512 may also including tracking the scores to determine a level or total score for each driver's risk-increasing or risk-reducing behavior.

In some examples, the computing device 300 at 512 determines a trip score by applying a different scoring method for event record objects 400 of each type of Type of Event key 404. For example, there may be four scoring processes, one for each of distracted driving, speed, acceleration, and braking. In one example, each scoring process passes a component score of zero or one and the computing device 300, at 512, combines, in a weighted manner, the score determined by each process. In some examples, the computing device 300, at 512, assigns a weight to each score component and determines an aggregate score from zero to one hundred. In one example, the computing device 300, computing an aggregate score, applies a weight to each score component as follows: distracted driving: 40%; speed: 40%; acceleration: 10%; and braking: 10%. In this example, a score for a vehicle trip with no events may be 100, whereas an event in any of the categories results in a weighted deduction from 100. For example, for a trip with only a braking event (whether one or more braking events), the computing device 300 may make a deduction of 10 (corresponding to the 10% weighting for the braking component) from 100, resulting in a vehicle trip score of 90. As another example, for a trip with at least one braking event and at least one speed event, the computing device 300 may make a deduction of 10 for the braking event plus a deduction of 40 (corresponding to 40% weighting for the speed component), resulting in a vehicle trip score of 50 (which is 100 minus the deduction of 50).

In some examples, the computing device 300 provides the event records 400 in the information data set 322 and/or a level or total score to a central location such as the service provider 116 and/or one or more servers associated with an analytics organization and/or an insurance company. For example, the service provider 116 may process event record objects 400 provided to it, with the service provider determining a trip score instead of, or in addition to, the computing device 300 at the vehicle determining the trip score. As another example, one or more servers of an insurance company may process event record objects 400 provided to it, with the one or more servers determining a trip score instead of, or in addition to, the computing device 300 at the vehicle determining the trip score. It should be understood that when the score (e.g., risk score indicative of a risk profile of the driver 102) is calculated at the one or more servers, separate from the computing device 300, by traditional mechanisms, it would be cumbersome, involving additional processing and network bandwidth, to correlate the driver activity information with the corresponding context information. By the mechanisms disclosed here, the driver activity information and context information is associated with each other, such as by way of the event record objects 400, by the computing device 300 and then sent to the one or more servers where the score is calculated, managed, stored, and/or used to analyze risk associated with one or more drivers 102.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

With the techniques disclosed herein, navigation to various display portions of a user interface is simplified for a user.

What is claimed is:
1. A method, comprising:
receiving, at a vehicle and by a computing device comprising one or more processors, driver activity information indicative of an operation of the vehicle by a driver, the driver activity information received from at least one of: a sensor or a second computing device associated with the vehicle;
determining, based at least in part on a value included in the driver activity information and a corresponding threshold level, that a data set corresponding to the driver activity information is to be generated;
receiving, by the computing device, context information from at least one of a service provider via a network or the second computing device associated with the vehicle, the context information indicative of an environment at a particular time and a particular location, the context information including at least one of weather conditions, traffic conditions, or construction activity at the particular location and at the particular time;
determining, by the computing device and based at least in part on the particular time and the particular location, that the driver activity information is correlated with the context information;
generating, by the computing device and based at least in part on determining that the data set corresponding to the driver activity information is to be generated, the data set including a first data field, a second data field, and a third data field, the first data field indicating the driver activity information, the second data field indicating the context information, and the third data field indicating the particular time or the particular location, wherein the driver activity information includes a first index and a second index, the first index indicating a type of driver activity and the second index indicating a subtype of the driver activity; and sending, to one or more servers, the data set, wherein the one or more servers are configured to generate a score based at least in part on information included in at least one of the first data field, the second data field, and the third data field.

2. The method of claim 1, wherein:

the driver activity information includes speed of the vehicle at the particular location and at the particular time.

3. The method of claim 1, further comprising:

generating, by the computing device, the score, wherein generating the score includes:

adjusting a speed limit threshold for the particular location based at least upon the context information, wherein the context information is indicative of the environment at the particular location;

comparing the speed of the vehicle as indicated by the driver activity information to the adjusted speed limit threshold at the first location; and generating the score at least in part based on a result of the comparing.

4. The method of claim 1, further comprising:

transmitting a request for the context information from the vehicle via the network.

5. The method of claim 4, wherein the request includes an indication of the particular location.

6. The method of claim 1, further comprising:

requesting the context information using an application programming interface of a service provider system, wherein the context information is received from the service provider system in response to requesting the context information.

7. The method of claim 1, further comprising:

generating the context information at the vehicle, based at least on a signal from the sensor that moves with the vehicle.

8. The method of claim 1, further comprising:

generating the context information at the vehicle, based at least on a signal from the sensor used by the vehicle in operating the vehicle.

9. A device, comprising:

one or more processors; and memory coupled to the one or more processors, the memory storing instructions executable by the one or more processors to perform operations including:

receiving driver activity information indicative of operation of the vehicle by a driver, the driver activity information received from at least one of: a sensor or a second computing device associated with the vehicle;

determining, based at least in part on a value included in the driver activity information and a corresponding threshold level, that a data set corresponding to the driver activity information is to be generated;

receiving context information, via a network from at least one of a service provider or the second computing device associated with the vehicle, the context information indicative of an environment at a particular time and a particular location, the context information including at least one of weather conditions, traffic conditions, or construction activity at the particular location and at the particular time;

determining that the driver activity information is associated with the context information;

generating, based at least in part on determining that the data set corresponding to the driver activity information is to be generated, a data set including a first data field, a second data field, and a third data field, the first data field indicating the driver activity information, the second data field indicating the context information, and the third data field indicating the particular time or the particular location, wherein the driver activity information includes a first index and a second index, the first index indicating a type of driver activity and the second index indicating a subtype of the driver activity; and sending, to one or more servers, the data set.

10. The device of claim 9, wherein:

the driver activity information includes speed of the vehicle at the particular location and at the particular time.

11. The device of claim 9, wherein the operations further include:

generating the score based at least in part on the data set; and sending the score to the one or more servers.

12. The device of claim 9, the operations further comprising:

transmitting a request for the context information from the vehicle via the network.

13. The device of claim 12, wherein the request includes an indication of the particular location.

14. The device of claim 9, the operations further comprising:

requesting the context information using an application programming interface of a service, wherein the context information is received from the service, in response to requesting the context information.

15. The device of claim 9, the operations further comprising:

generating the context information at the vehicle, based at least on a signal from the sensor that moves with the vehicle.

16. The device of claim 9, the operations further comprising:

generating the context information at the vehicle, based at least on a signal from the sensor used by the vehicle in operating the vehicle.

17. One or more non-transitory computer-readable media storing instructions that, when executed by one or more processors of a device at a vehicle, configure the device to perform operations including:

receiving driver activity information indicative of operation of the vehicle;

determining, based at least in part on a value included in the driver activity information and a corresponding threshold level, that a data set corresponding to the driver activity information is to be generated;

receiving context information, from a service provider via a network, indicative of an environment at a particular time and a particular location, the context information including at least one of weather conditions, traffic conditions, or construction activity at the particular location and at the particular time;

correlating the first information and the second information to generate a data set including a first data field, a second data field, and a third data field, the first data field indicating the driver activity information, the second data field indicating the context information, and the third data field indicating the particular time or the particular location, wherein the driver activity information includes a first index and a second index, the first index indicating a type of driver activity and the second index indicating a subtype of the driver activity; and sending the data set to one or more servers configured to generate a score based at least in part on the data set.

18. The one or more computer-readable media of claim 17, wherein the operations include:

generating the score based at least in part on the data set; and sending the score to the one or more servers.

19. The one or more computer-readable media of claim 17, the operations further comprising:

transmitting a request for the context information from the vehicle via the network.

20. The method of claim 1, further comprising:

determining, by the computing device, that a particular trip has ended, wherein sending the data set is based at least in part on the determining that the particular trip has ended.

21. The method of claim 1, wherein the first index indicates one of (i) an acceleration/deceleration event; (ii) a speeding event; or (iii) a distracted driving event.

* * * * *